No. 665,830. Patented Jan. 8, 1901.
J. B. HURD.
VENDING AND CARRIER APPARATUS FOR STORE SERVICE.
(Application filed June 23, 1900.)
(No Model.) 6 Sheets—Sheet 1.
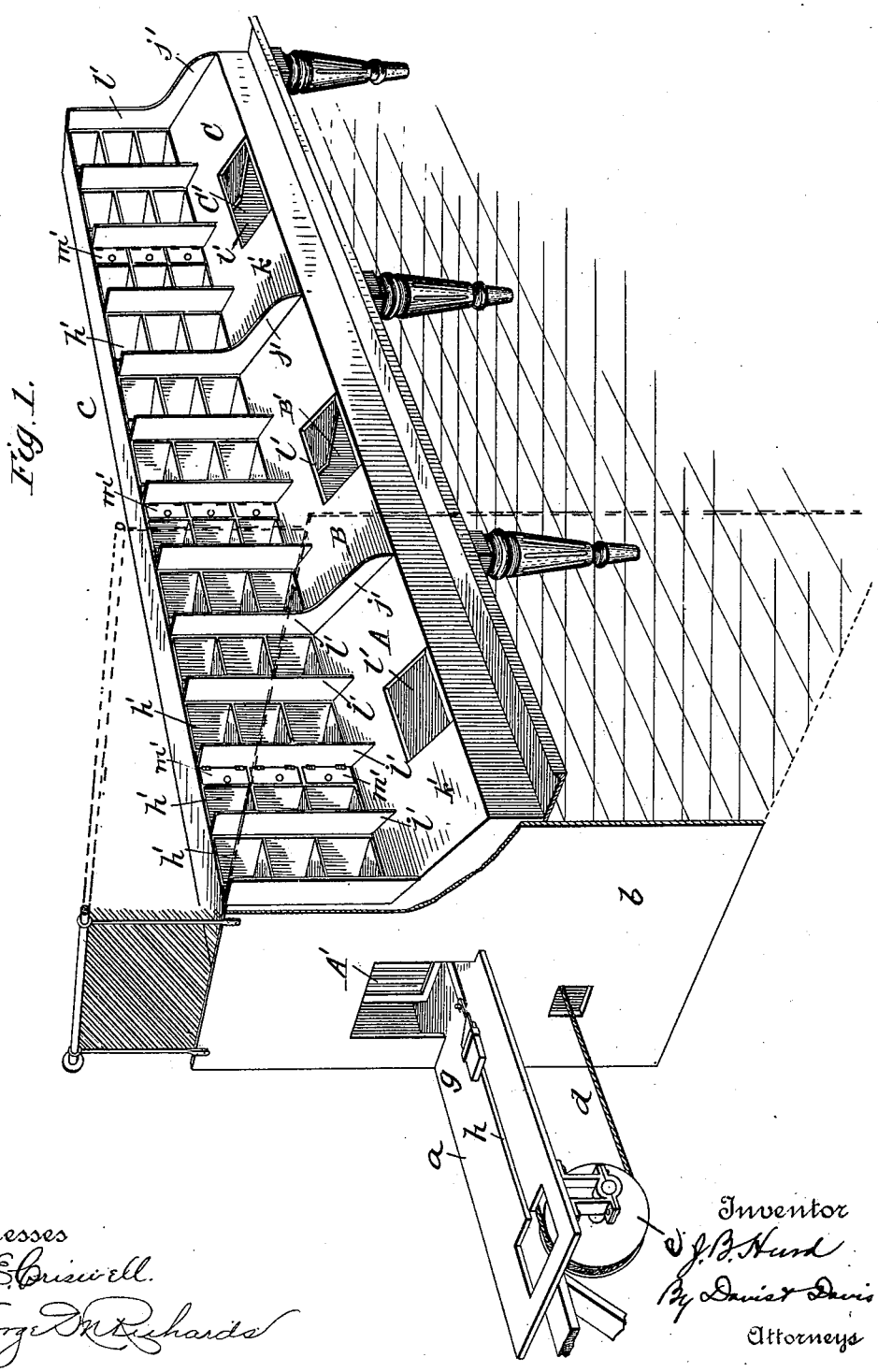

No. 665,830. Patented Jan. 8, 1901.
J. B. HURD.
VENDING AND CARRIER APPARATUS FOR STORE SERVICE.
(Application filed June 23, 1900.)
(No Model.) 6 Sheets—Sheet 2.
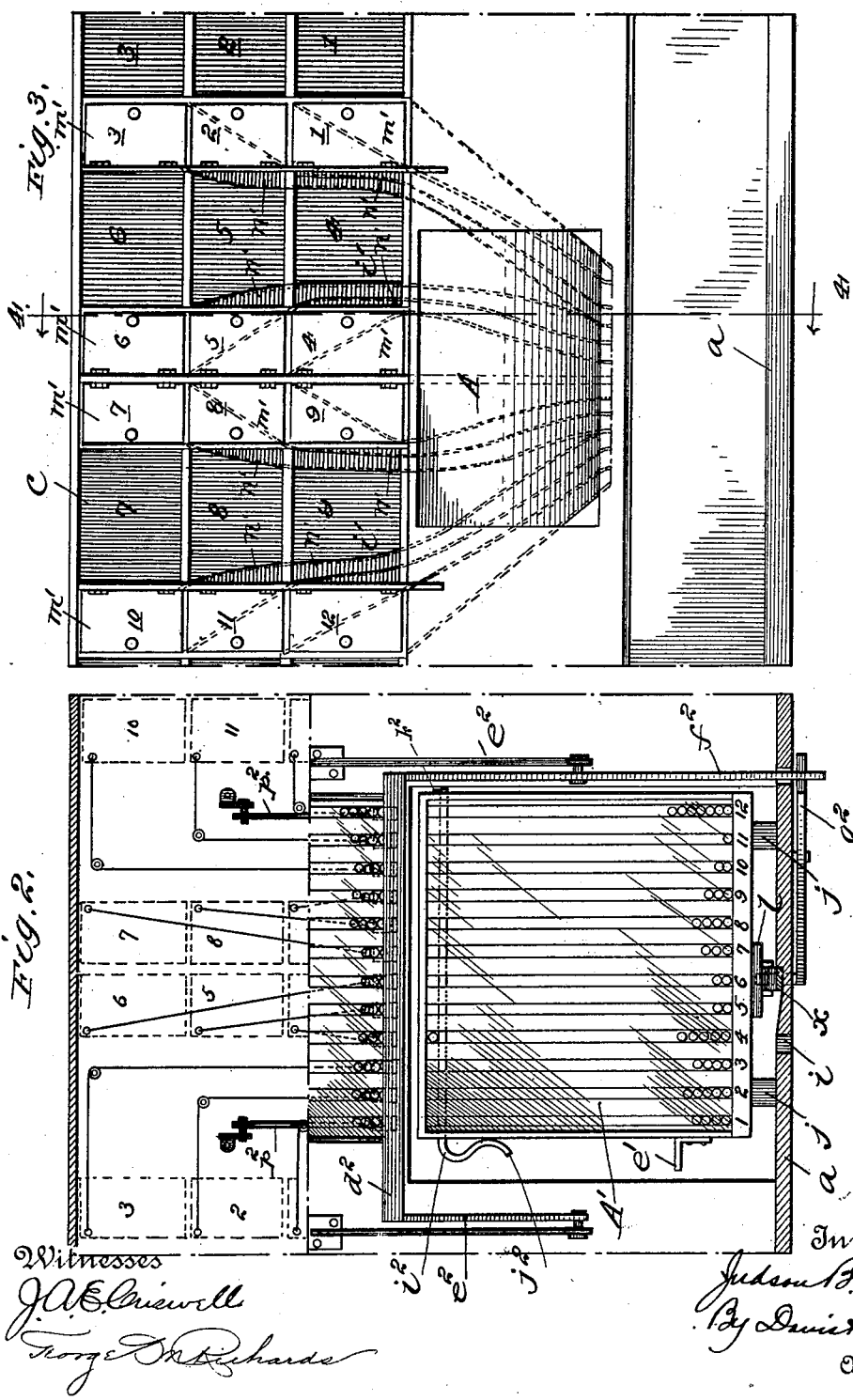

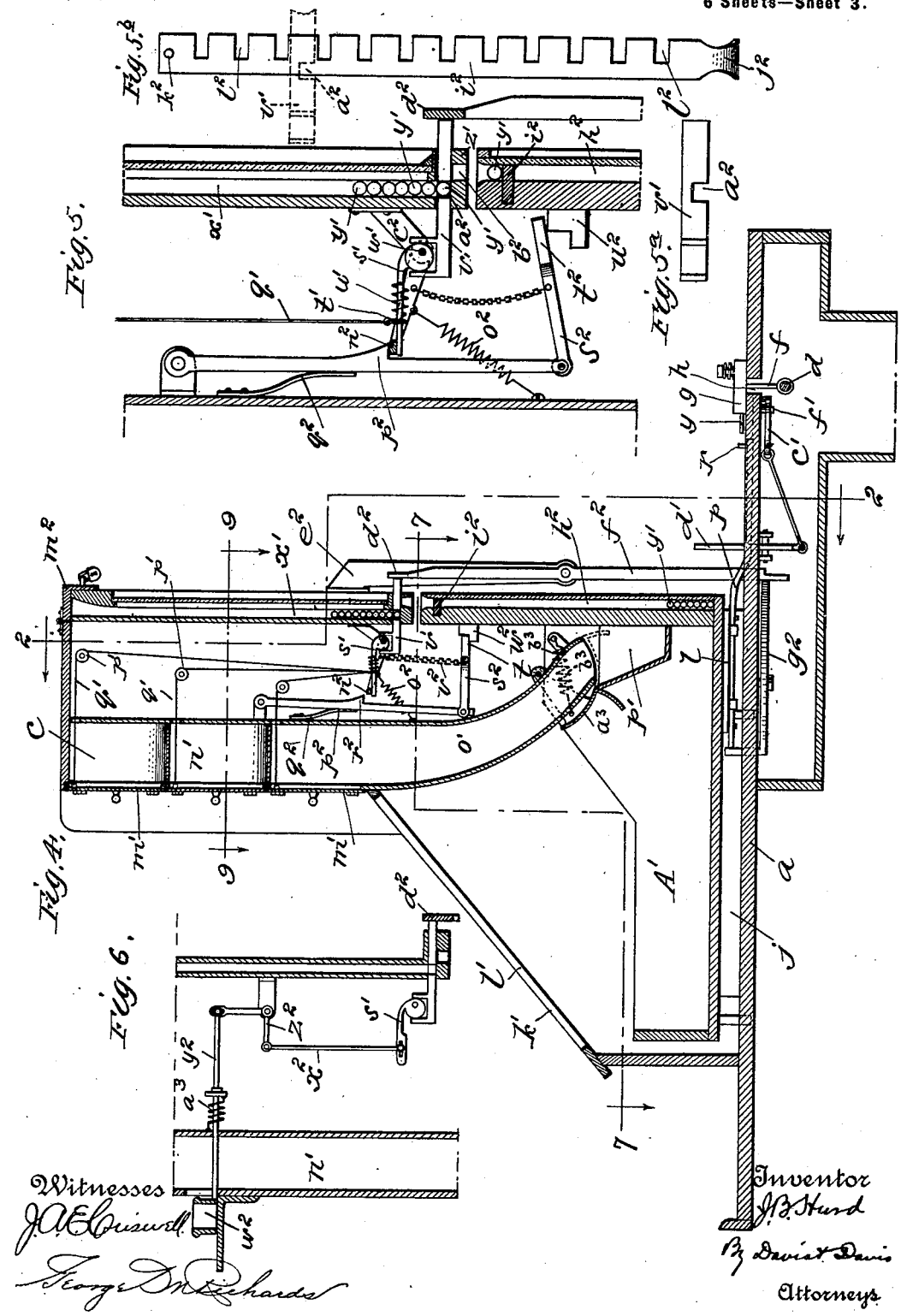

No. 665,830. Patented Jan. 8, 1901.
J. B. HURD.
VENDING AND CARRIER APPARATUS FOR STORE SERVICE.
(Application filed June 23, 1900.)
(No Model.) 6 Sheets—Sheet 4.
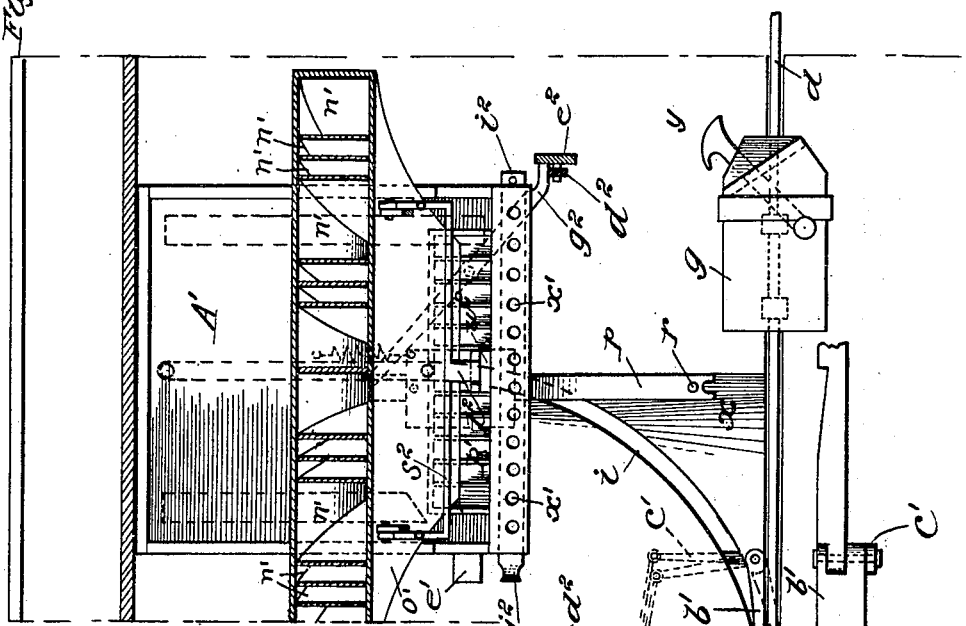
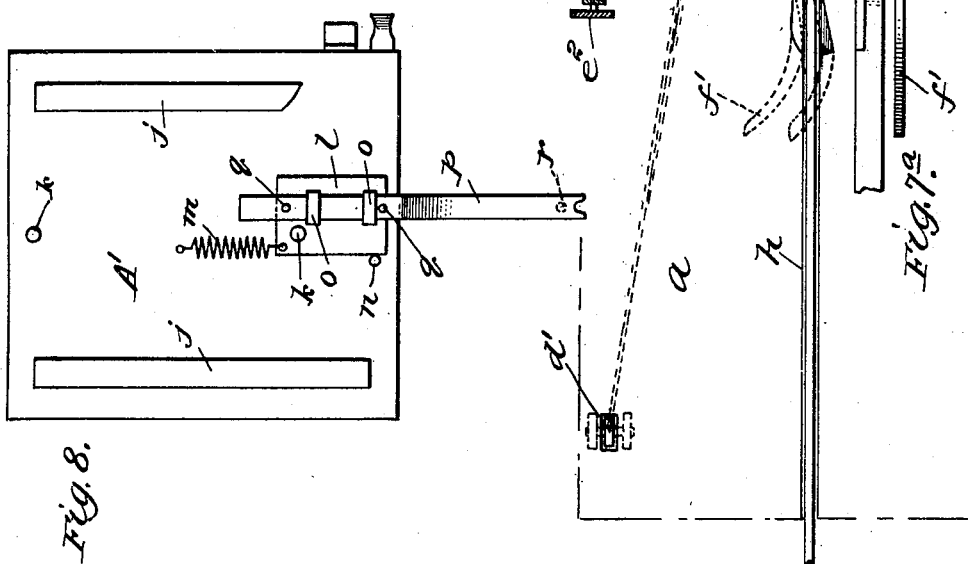
Witnesses
Inventor
Judson B. Hurd
By Davis & Davis
Attorneys

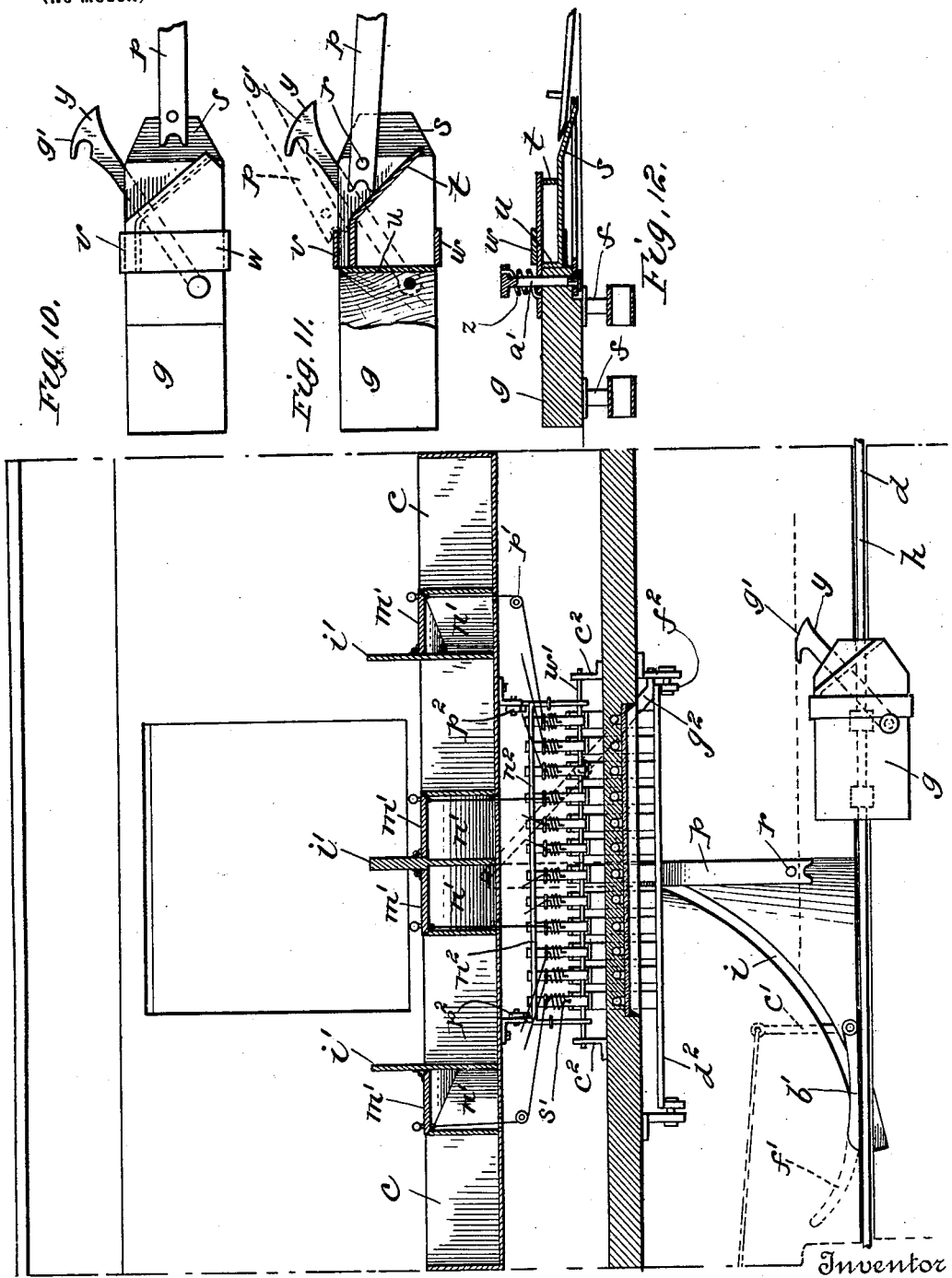

No. 665,830. Patented Jan. 8, 1901.
J. B. HURD.
VENDING AND CARRIER APPARATUS FOR STORE SERVICE.
(Application filed June 23, 1900.)
(No Model.) 6 Sheets—Sheet 6.
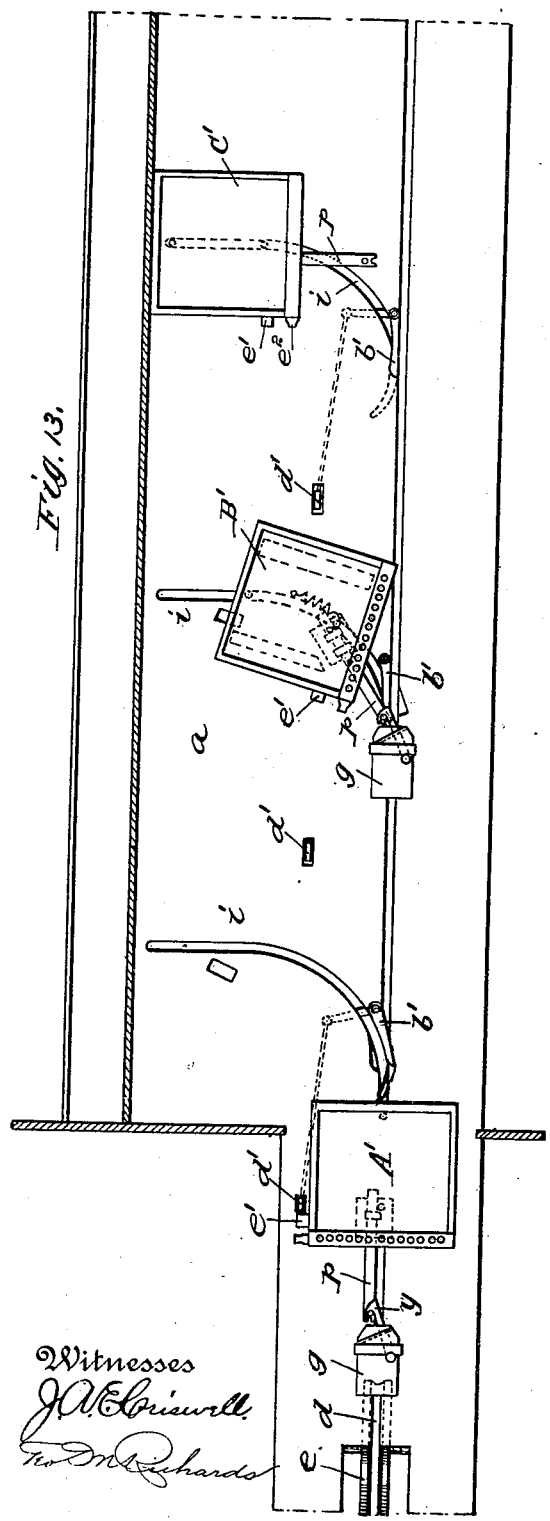
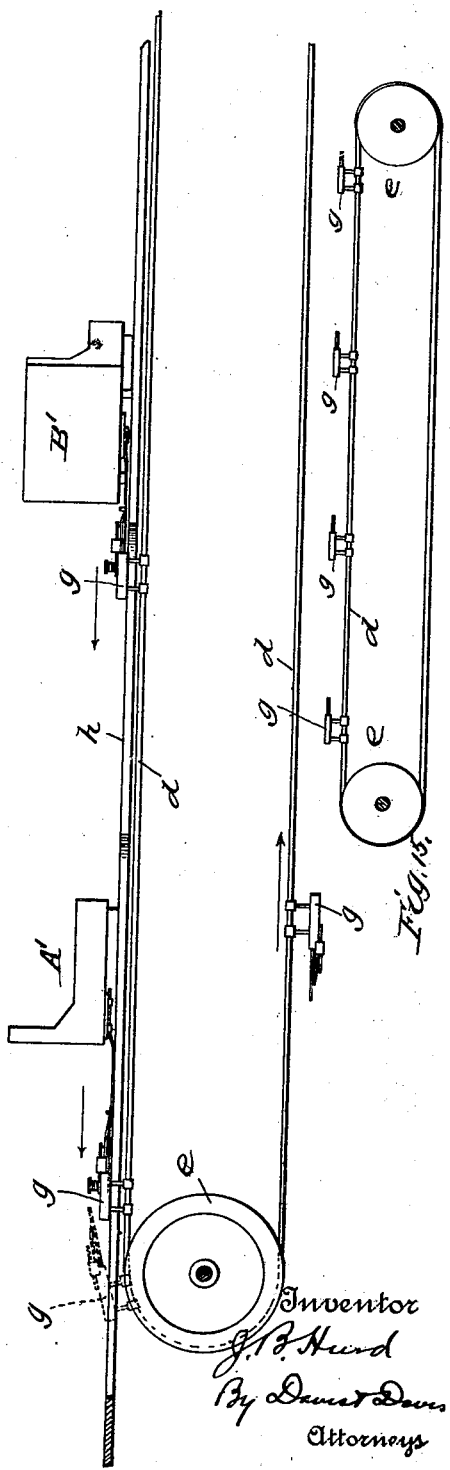

United States Patent Office.

JUDSON B. HURD, OF BROOKLAND, DISTRICT OF COLUMBIA.

VENDING AND CARRIER APPARATUS FOR STORE-SERVICE.

SPECIFICATION forming part of Letters Patent No. 665,830, dated January 8, 1901.

Application filed June 23, 1900. Serial No. 21,330. (No model.)

*To all whom it may concern:*

Be it known that I, JUDSON B. HURD, a citizen of the United States, residing at Brookland, in the District of Columbia, have invented certain new and useful Improvements in Vending Apparatus for Stores, of which the following is a full, clear, and exact description, reference being had therein to the accompanying drawings, in which—

Figure 1 is a perspective view of an apparatus embodying a preferred form of my invention, a portion of the partition-wall between the salesroom and the wrapping or stock department being broken away for the purpose of better illustration; Fig. 2, a vertical section on the line 2 2 of Fig. 4; Fig. 3, a front elevation of a part of the sample-exhibiting cabinet; Fig. 4, a vertical section on the line 4 4 of Fig. 3; Fig. 5, a detail section, enlarged, showing the mechanism for registering the purchase and locking the registering apparatus after the purchase is made and during the time the order is being filled. Fig. 5$^a$ is a detail view of one of the slides for discharging the indicating-checks. Fig. 5$^b$ is a detail view of a closure-slide for the magazine carried by the cars or carriers; Fig. 6, a detail view of a modified form of the devices for operating the check-discharging slides; Fig. 7, a horizontal section on the line 7 7 of Fig. 4; Fig. 8, a detail bottom view of one of the cars or carriers; Fig. 9, a horizontal sectional view on the line 9 9 of Fig. 4; Figs. 10, 11, and 12, detail views of one of the cable-blocks moving the cars to and from the delivery-stations in the salesroom; Fig. 13, a plan view of the table or platform on which the cars rest and move, one of the cars being shown at rest at its delivery-station and the other two cars being shown in the act of traveling back to the stock or wrapping room; Fig. 14, a side view of the devices shown in Fig. 13, except that the outermost car C' is omitted; and Fig. 15, a diagram of the cable and its series of slide-blocks.

One object of the invention is, briefly speaking, to provide a simple apparatus whereby small articles of merchandise may be sold by sample and without the aid of the usual clerks, the arrangement being such that the customer himself, by the simple act of depositing the purchase-money in a suitable receptacle adjacent the exhibited sample of the article he desires, puts into action suitable mechanism whereby the order and purchase-money are transmitted to the cashier, located at some remote point in the stock-room or wrapping department, where the article ordered is wrapped and then returned to the customer in the salesroom, together with his change, if there be any.

A further object is to provide means for registering the number of articles of each kind sold, and thus keep a check on the cashier and other attendants in the stock department, as more fully hereinafter set forth.

In the apparatus shown and described herein, which embodies probably the most complete form of my invention and which I therefor prefer, I employ, first, a carrier apparatus for transporting cars from the various delivery-stations in the salesroom to the wrapping or stock department and returning them from this latter department to their various stations, whereby a customer may send to the stock-room an order and purchase-money for an article of merchandise and in a brief space of time receive the article ordered properly wrapped, together with any change that may be due; second, a cabinet whereby the samples or other representations of the various articles of merchandise offered for sale may be exhibited to enable the purchaser to make choice of the articles, and, third, mechanism whereby by simply depositing the purchase-money the customer may communicate to the clerk or cashier in the stock-room information as to the article he desires and at the same time deliver the purchase-money to the cashier in the stock-room, whereby the employment of sales-clerks in the salesroom is avoided and much time and money are saved in selling the articles, as more fully hereinafter set forth.

As a further development of the invention I contemplate employing in addition to the foregoing mechanism simple mechanism for automatically registering the purchases, and thereby keep a strict check against cheating on the part of the employees, as more fully hereinafter set forth.

In the apparatus shown a suitable platform or table $a$ is employed for the support of the series of cars A' B' C', said platform extending from the stock-room through the partition-wall b, dividing the stock-room from the sales room or department. This platform forms the support or bottom of the sample-exhibiting cabinet c, which consists of a suitable upright casing divided into a series of pigeonholes or compartments for the reception of the samples of the articles of merchandise offered for sale. In the present construction an endless cable d is employed, this cable being mounted on a pair of driving-pulleys e, supported underneath the platform a at the opposite ends and adapted to be driven by any suitable mechanism. The upper part of this cable runs close to the under side of the platform a, and attached to the cable, each by a pair of short posts f, is a series of blocks g, which slide upon the upper surface of the platform as the cable moves, the platform being slotted longitudinally at h for the reception of the posts f, connecting the blocks to the cable. This slot forms the main way or track of the carrier mechanism, and the cable and its series of blocks subserve the purpose of a propelling medium. Diverging from the main slot is a series of lateral or branch slots i, leading to the various stations along adjacent to the sample-cabinet, there being three of these delivery-stations (designated by letters A B C) in the present construction. These latter slots form the side tracks or ways of the carrier apparatus.

The cars or carriers consist each of a suitable tray having secured to its under side a pair of strips j, which rest upon the table and support the car slightly above the surface of the same, and depending from the bottom of each car is a pair of central guide-pins k, which are located, respectively, near the front and rear sides of the car and which work in the slots h and i and serve to guide the car in its movements on the table. Pivoted to the under side of each car on the pin k at the rear of the car is a plate l, the pivotal point of this plate being at one of its inner corners, and this plate is actuated by a spring m, connecting its inner corner, adjacent to the pivot, to an adjacent point of the car-bottom, this spring serving to hold the outer or rear end of plate l normally against a stop-pin n, fastened in the bottom of the car, whereby the plate l will be held in alinement with the pins k and parallel with the supporting-strips j. Attached to the under side of each plate l by means of keepers or loops o is a bar p, which has a sliding movement in the keepers o, this movement being longitudinally of the car and parallel with strips j and being limited by means of stop-pins q, carried by the bar. The rear outer portion of the bar p is bent down and made slightly resilient, so that it rests lightly upon the surface of the table. The extreme rear end of this bar is notched, and near this notched end is fastened an upward-projecting pin r.

Each of the blocks g is provided with a forward-projecting downward-inclined nose or scraper s, which moves along close to or lightly in contact with the table-surface and is adapted to automatically pick up the end of one of the bars p as the block moves forward. Just back of the scraper s and above it is formed a wall t, which inclines from one side of the block rearwardly toward and near to the opposite side, the rearmost end of this wall t being turned directly backward and terminated at a transverse wall or shoulder u on the block. At the side of the block adjacent to the rearward-turned end of the inclined wall t is a vertical shoulder v, which constitutes one side of a loop w, which embraces the block and is secured rigidly thereto. With this construction it will be observed that as the block g slides along the table-surface the scraper s will pick up the rear end of bar p (which normally projects rearward from the carrier) and the wall t will guide or swing it to one side and direct the notch in its rear end into engagement with the vertical shoulder v, in which position the bar p and its plate will stand at a slightly-oblique angle to the line of movement; but owing to the fact that the pivot-pin k of the plate l is located at one corner of said plate and in the center line of the car the pushing action will be approximately in the center of the car and sidewise strain on the guide-pins k and the track will thereby be avoided. Then when the car reaches its particular side track and is switched into the same by the devices hereinafter set forth the car will be pushed sidewise to its point of rest on the side track by the bar p, this bar and its plate l swinging around on the pivot k until the plate comes against the stop-pin n and reaches a position at a right angle to the line of movement of the block, whereupon the notched end of the bar will release itself from the shoulder v of the block. It will be observed that with this construction, as fully set forth in my former application, Serial No. 734,454, filed October 23, 1899, the car will come to its point of rest at the end of the side track with a gradually-retarded movement, whereby undue shock and noise in delivering the cars to their respective stations will be avoided.

As will be observed, the bar p at each station drops into a recess x, formed in the table-surface at each station, so that although the bar projects out into the path of passing cars it will not interfere with their free movement. The slight resiliency of the push-bar is sufficient to permit it to thus drop into its recess. As the car is pushed to its station on the side track it will be observed that the bar p is pushed inward until its rearmost stop q comes against the rearmost loop o, and also that one edge of the bar when it comes to rest in the recess x will bear against the outermost wall of the recess, which is made abrupt to form an abutment at a right angle to the main track. The depression in the table is very slight, it being only necessary to bring the bar p flush with or a little below the table-surface, and the wall of this recess nearest to the stock-room is beveled downward, so that the bar will move into and out of the recess freely. When it is desired to return the cars to the stock-room, the cable is reversed and the blocks move backward over the table-surface. Each block is provided with a forward-extending hook $y$, which is pivoted to the under side of the block near its forward end and extends outward beyond one side of the block and is normally held in the path of the upward-projecting pins $r$ on the pusher-bars by means of the coil-spring $z$, attached to the upper end of its pivot $a'$, which extends up through the block $g$ and has the spring attached to its upper projecting end.

As will be seen from Figs. 7 and 9, the pins $r$ (which at all times project above the table-surface) are pushed back out of the path of the hooks Y by the act of pushing the cars to their stations, so that until the bars are again pushed out the hooks will pass them without engagement therewith; but when only one of the bars is pushed out by a customer, as hereinafter set forth, to the limit of its movement on plate $l$ the pin carried by that particular bar will be caught by the first returning block that passes it and the car will be carried back to the stock-room. As will be observed from Fig. 13, when the hook engages one of the pins the hook and the bar both swing on their pivots against the action of their respective springs, so as to give as direct a pull as possible to the car and return it with the least possible shock and strain on the parts. As the car moves from its point of rest toward the main track the bar $p$ is first swung to an oblique position with respect to the car, and then as the car approaches the main track this bar gradually swings back toward its normal position, so that when the car has reached the main track the coupling-bar will lie parallel with the line of movement of the car. Thus the cars will be returned to the main track with a gradually-accelerated movement, avoiding noise and injury from jar, as more fully set forth in my former application referred to hereinbefore. The release of the hook from pin $r$ takes place in the stock-room when the block is carried down through an opening in the table, the tilting of the block caused by its passing over the cable-pulley lifting the hook out of engagement with the pin $r$, leaving the car to be lifted or pushed to one side by an attendant until the article ordered, together with the customer's change, is deposited in it.

The switch at each station consists of a switch-rail $b'$, pivoted in a recess at the junction of the main and side tracks and having its free, beveled, or tapered end adapted to rest in suitable recesses in the respective side walls of the main slot, as shown, whereby it may be swung across the main slot to direct the car into the side branch, or vice versa. Attached to the lower extended end of the pivot of the switch-rail is a lateral arm $c'$, which is connected by a rod to the lower end of a switch-lever $d'$, pivoted in an adjacent opening in the table, this lever being so located that its upper part comes close to the sides of the cars adjacent to the side stations as the cars pass along the main track, as shown in Fig. 13. Attached to each car is a tappet $e'$, which is adapted to strike one of the levers $d'$ when the cars are moving outward to their stations and throw the switch and shunt the car into its lateral track, these tappets all being set at different heights from the table-surface and the levers being correspondingly graded as to length, so that each tappet will operate one particular switch and none other, whereby each car will automatically select its own station every time it is sent out from the stock-room with the sold package. After the guide-pins $k$ on the car pass into the side slot the forward end of the post $f$ of the slide-block that happens to be propelling the car strikes against a curved cam-arm $f'$, attached to the switch-rail at a point under the table and projecting toward the stock-room and automatically swings the switch-rail across the entrance to the side slot and thus closes the same, the switch-lever being by this operation brought to an upright position again. The parts remain in this position until the direction of movement of the cable is reversed and the blocks are caused to return to the stock-room. Then as the first block that comes along picks up the car and hauls it back in the manner set forth hereinafter one of the pins $k$ will strike the switch-rail directly and throw it out across the main slot, and thus permit the car to pass onto the main track. Then the next succeeding block on the cable will come in contact with the opposite side of the switch-rail and throw it back again across the entrance to the side slot, in which latter position it will remain until the car adapted to this particular station is returned.

While I may, of course, operate the cable by hand or otherwise in the practical operation of the apparatus, I propose employing a suitable motor that will automatically and continuously operate the cable intermittently in opposite directions, so that on each outgoing movement of the cable such of the cars as are loaded for return to the customers and are placed on the track will be automatically returned to their respective stations without further attention on the part of the bundle-wrappers or other attendants in the stock-room, and such of the cars whose coupling-bars are adjusted for engagement with the hauling-hooks will be taken up at regular intervals of short duration and conveyed to the stock-room. But whatever be the motive power employed the cable will be intermittently operated in opposite directions, and I believe the best results will be obtained by employing only a sufficient number of the slide-blocks and so spacing them that they are brought within a space less than one-half the length of the cable, as shown in Fig. 15, so that with each outgoing movement the last block to leave the stock-room may be carried beyond the last or fartherst station without bringing the first block that left the stock-room back to the starting end of the table, and with each reverse movement of the cable the last block to come in will reach its delivery-point on the table in the stock-room before the first incoming block has reached the outermost station, in which manner the liability of reversing the cable before all the cars are delivered in going in either direction is entirely avoided. In other words, whatever be the mechanism employed for operating the cable care must be taken to see that each of the blocks passes all the stations and the delivery-point in the stock-room in going both outward and inward. It will be further observed that should one of the coupling-bars be pushed out into the path of the hooks $y$ while the blocks are on their outgoing trip the beveled noses $g'$ of such of the hooks as have not already passed the particular coupling-bar will strike against the pin $r$ on the coupling-bar, and thereby swing the hook back out of the way against the action of its spring $z$, the frictional engagement of the coupling-bar with the abrupt wall of the recess $x$ in which it lies being sufficient to prevent the coupling-bar sliding back under the car out of the path of the hooks. Thus after the bars are once adjusted for return they will not be disturbed until engaged by the ingoing hooks.
The sample-cabinet is divided up into vertical series of small compartments $h'$ for the reception of the samples of merchandise to be exhibited. The back of the cabinet is closed and its front may also be closed by suitable glass panes or doors, or left open, as shown, and the articles may be fastened by cords or chains, this latter plan being perhaps the most desirable, as it will permit of the handling and close inspection of the articles by the customers and at the same time prevent the theft of the articles. Each vertical series of compartments is separated from its neighboring series by vertical partitions $i'$, and at intervals, as shown at $j'$, these partitions are extended down across the downward-inclined housing $k'$ of the base portion of the cabinet, and the several series of compartments comprised between each two adjacent partitions $j'$ $j'$ constitute one station, there being three stations of twelve compartments each in the present instance. Each group of compartments is located just above one of the stations of the carrier apparatus, so that one car will relate to and serve an entire group of compartments, the car $A'$ belonging to station A, car $B'$ to station B, and car $C'$ to station C, as is obvious. In order that the purchasers may remove the purchased and wrapped articles from the cars when they are returned from the stock or store room, the top of the housing or counter is provided with a suitable opening $l'$, coincident with each of the car-stations.

Adjacent each sample-compartment $h'$ is a small outward-swinging door $m'$, which normally closes an opening leading to a vertical money-chute $n'$, built into the cabinet, and all the money-chutes of each station or group of compartments converge at their lower ends into a common spout or chute $o'$, which tapers downward and terminates just over or within the car belonging to the particular group. Desirably the spout is curved at its lower end, so as to empty into a money pocket or tray $p'$, attached to the rear wall of the car. When a customer has made a choice of the articles exhibited, he simply opens the door $m'$ adjacent the compartment containing the chosen article and drops into chute $n'$ the purchase-money, whereupon suitable mechanism will not only adjust the coupling-bar $p$ on the car for transmission to the cashier in the stock-room, but will also deposit a check in a magazine on the car, which check will not only inform the clerk or cashier when the car reaches him what article is desired, but will also register the purchase, and thus keep a check on the employees. When the attendant receives the car containing the order, he places the article desired, properly wrapped, together with the customer's change, if there be any, in the car, and upon the reverse movement of the cable the car is promptly returned to the proper station, where the customer is awaiting its delivery. The mechanism shown for thus adjusting the coupling devices and registering the transaction and communicating to the cashier the order will now be described; but I desire it distinctly understood that I may use any mechanism without departing from the spirit of the invention.

Connected to each door $m'$ is a wire $q'$, which passes back through the rear wall of the money-chute over a pulley $p'$, suitably located, and then down to a cam-lever $s'$, to whose forward-extending free end it is slidably attached by a collar $t'$, which latter is attached to the lever by means of a coil-spring $u'$. The rear end of the lever $s'$ is provided with a cam or eccentric part which is embraced by an upright pair of lugs carried by a slide $v'$ and which is pivotally supported on a horizontal rod $w'$, so that an upward pull on wire $q'$ will raise the free end of lever $s'$ and push rearward slide $v'$, the spring $u'$ permitting a limited movement of collar $t'$ on the lever to avoid injury should the customer open the door too wide. The slide $v'$ works under the lower end of a vertical tube $x'$, located in the rear wall of the cabinet and adapted to serve as a magazine for a stack of spherical indicating-checks $y'$, which are gravitatingly supported upon a plate $z'$, closing the lower end of the magazine and supporting said slide. The slide is notched at $a^2$ for the reception of the lowermost check-ball, and beyond the tube $x$ and out of register therewith the plate $z'$ is provided with an opening $b^2$, through which the check-ball drops when the slide is pushed rearward by the opening of the money-door. These check-discharge devices are grouped to correspond with the groups of sample-exhibiting compartments—that is, all the levers connected to the doors of each of the stations A B C are brought close together and pivoted on a single rod $w'$, suitably supported in brackets $c^2$ on the rear wall of the cabinet, and the slides and magazine-tubes belonging to each group of levers are likewise brought close together.

Extending across and in contact with the rear ends of each group of slides $v'$ is a bar $d^2$, whose downward-turned ends are pivoted on the lower ends of pendent brackets $e^2$, attached to the rear wall of the cabinet, and one of the downward-turned ends of the bar is extended to form a lever $f^2$, whose lower end works through an opening in table $a$ and engages one end of a lever $g^2$, pivoted on the under side of the table and having its free end bent upward to work through an opening in the table, this upward-turned end lying and terminating just behind and in contact with the inner end of the coupling-bar on the car belonging to the adjacent station. With this device it will be observed that the operation of any one of the check-dropping slides will cause bar $d^2$ and levers $f^2$ and $g^2$ to push the coupling-bar out rearward to bring its pin $r$ into the path of the hooks $g'$ of the slide-block, and thus insure the transmission of the car to the stock-room upon the next inward journey of the slide-blocks, and when the car is returned to its station, with the purchased article, the coupling-bar will be pushed against the upturned end of lever $g^2$, and thus restore the parts to proper position for another operation.

As will be seen, the rear wall of each car is extended vertically, so that when the car is at its station the upper edge of this wall will come just under the plate $z'$, closing the group of magazine-tubes $x'$ belonging to the particular station, and in this rear wall is built or secured a series of vertical magazine-tubes $h^2$, corresponding in number to the group above and being in vertical alinement with the respective discharge-openings $b^2$ of the upper tubes, so that each upper tube will discharge into a particular lower tube. The tubes may be correspondingly numbered and also covered with glass and provided with graduated marks for convenience in determining without mental calculation the number of check-balls in the various tubes, and consequently the number of articles of each kind sold. The sample-compartments $h'$ and doors $m'$ may also be numbered to correspond with their particular tubes for convenience. Extending across the upper edge of the rear wall of the car, just below the upper ends of the tubes $h^2$, is a slide $i^2$, which normally closes the entrances to all the tubes, one of its ends being extended and formed into a spring $j^2$, which bears against one edge of said rear wall, and its other end, which extends slightly beyond the opposite edge of the wall, being provided with a stop $k^2$. This slide is provided with notches $l^2$ in one edge, corresponding in number to the magazine-tubes. Normally the notches non-register with the tubes $h^2$, so that any checks $y'$ which may be deposited in the tubes by the slides $v'$ will rest on this slide. In this way the check will be held separate from the check previously deposited until the car reaches the cashier and he notes the article ordered, after which the slide $v^2$ may be pressed endwise against the action of its spring $j^2$ far enough to bring the notches $l^2$ into register with the tubes, and thereby drop the supported check in whatever tube it may have been deposited.

The number of articles of any one sort is ascertained by examining the number of remaining checks in the upper magazine-tube corresponding with it, the number of checks previously placed in the upper tube having of course been previously noted, and to prevent tampering with the checks in the upper magazine each group of tubes is closed at its top by a lock-plate $m^2$. It will therefore be noted that the object in employing magazine-tubes on the car is not to keep a check on the attendants, but simply to inform the attendant what article is desired by the customer and also to conveniently store the checks and prevent them being lost or mislaid. Therefore it is obvious that instead of dropping the checks into separate tubes they may all be dropped into the car proper; but in this case they will have to be numbered to correspond with the upper magazine-tubes and the sample-holders in order to communicate to the attendants in the wrapping department the article ordered. Another advantage in using the group of magazine-tubes on the car is that when it is desired to return the checks to the stationary tubes this may be accomplished conveniently by simply lifting the cars bodily off the table and inverting them over their respective stationary magazines, taking care that corresponding tubes register with each other, so that the checks will run back by gravity into the proper stationary tubes, whereby all direct handling of the checks is avoided.

To normally hold levers $s'$ down and keep their connected doors closed, a bar $n^2$ is arranged to rest on the free ends of each group of the levers, the ends of the bar being bent rearward and pivoted on shaft $w'$ and the resilient pressure on the levers being obtained by a spring $o^2$, connecting one of its rear-turned ends to the rear wall of the adjacent money-chutes. To lock all the money-doors and connected devices after an order has been given, (and thereby prevent the confusion that would result were an attempt made to give another order at that particular station before the previous order was filled,) I employ a lock device for each group of devices consisting of a pair of pendent bars $p^2$, pivoted to the rear wall of the money-chutes at a point above the levers $s'$ and kept normally swung rearward by spring $q^2$, and each being provided about midway its length on its rear edge with a beveled lug $r^2$, which is adapted to engage over bar $n^2$ and prevent it being raised when the bars $p^2$ are free to move rearward in obedience to their actuating-springs. Pivotally connected to the lower free ends of bars $p^2$ is a yoke $s^2$, which projects rearward and is provided with a projection $t^2$, which engages a shouldered block $u^2$ on the inner face of the rear wall of the car. This yoke $s^2$ is loosely supported at its free end by a chain $v^2$, depending from one of the side arms of the bar $n^2$. When the car is pushed to its station, block $u^2$ strikes against the end of projection $t^2$ and forces and holds back the bars $p^2$, so that their latch-like projections $r^2$ will be held out of engagement with bar $n^2$. Then when an order is given the lifting of bar $n^2$ disengages yoke $s^2$ from block $u^2$, as shown in Fig. 5, and permits the bars $p^2$ to swing out and bring their latch-lugs $r^2$ into the path of said bar $n^2$, so that when this bar $n^2$ is drawn down after the customer releases the money-door by spring $o^2$ it will spring under lugs $r^2$ and be locked against further movement upward until the car returns and disengages the lugs by engagement with projection $t^2$, as before.

In the modification shown in Fig. 6 instead of swinging doors and wires I employ a sliding open-bottom money-tray $w^2$, which when pushed in with the customer's purchase-money deposits the money in the money-chute and operates the cam-levers $s'$ by means of rods $x^2$ $y^2$ and bell-crank $z^2$, a spring $a^3$ being employed to keep the money-drawer pushed out. It is obviously within the scope of my invention to employ this or any other suitable mechanism whereby the customer by the act of depositing his purchase-money not only gives the order for the article desired, but also registers the purchase. It is also obvious that various other changes in the construction might be made without in the least departing from the spirit of the invention, since in its broadest aspect the invention consists of, first, means for exhibiting samples, names, or other representatives of the articles offered for sale, thereby enabling the customer to select by sight the desired article; second, means adjacent each sample exhibited whereby the customer may indicate his choice of articles to the clerk in the stock-room, which may be at a remote point; third, means whereby the purchase-money may be transmitted to the stock-room and the purchased article, together with the customer's change, delivered to the customer at the point of deposit of the money in the sales-room; and a further development of the invention contemplates the employment of any suitable means for automatically registering each purchase by the act of depositing the money and sending the order, this being preferably done by employing a series of indicating-checks for each sample exhibited and means for releasing or discharging a check with each purchase and transmitting it, together with the purchase-money, to the cashier in the stock-room, this check being also thereby utilized as a means of communicating the order to the attendant in the stock-room, as fully set forth.

As a still further elaboration of my idea, I group the sample-exhibiting compartments or devices and provide a car or carrier for each group, and in order to avoid numbering the indicating-checks I provide means for temporarily segregating them on the cars, so that when the cars reach the stock-room a glance at the check-receiving devices will inform the attendants as to the customer's order, and in order to prevent the confusion that would result if the registering and ordering devices were operated while an order given at the same station was being filled I provide means for automatically locking those devices during the time each order is being filled, as set forth.

It will be understood that wherever I use the term "sample" I mean it to be broad enough to cover any symbol or representative of the article offered for sale. I also wish it understood that I do not lay claim in this application to anything claimed in my copending application, Serial No. 734,454, in which a carrier apparatus somewhat similar to the one herein shown and described is covered.

It will be observed that although the money-chutes $n'$ converge into a single spout they are kept separate, so that they will deposit at different points in the money-tray $p'$, and in order to keep the purchase-money of the various chutes separate said tray $p'$ is divided into as many receptacles or compartments as there are money-chutes contained in the spout. By thus providing separate pay-receptacles for each money-chute the pay-receptacles may be numbered or otherwise designated to correspond with the numbers or other designating characters of the money-doors and sample-holders, whereby these pay-receptacles will serve as an additional means of indicating to the attendant in the stock-room the customer's order, one indicating or ordering device serving as a check upon the other, thereby more surely eliminating errors. These separate pay-receptacles are also advantageous in that they avoid confusion in case two or more orders are given at the same time, as might occur at an unusually busy period, as it will be obvious that by keeping the purchase-money of the several orders separate the stock-room clerk can readily determine with which of the sold articles the change, if there be any, is to be returned.

In order to prevent any purchase-money being deposited on the table when the car is away from its station, I pivot upon the spout, near its discharge end, a valve $a^3$, which is normally held, by means of a spring $b^3$, under the mouth of the spout and is pushed forward from under the same by the money-tray $p'$ when the car reaches its station, as shown in Fig. 4. This will be especially advantageous in case any of the money-chute doors $m'$ are forced open by a customer or become disconnected from their wires $q'$.

It will be observed that while this apparatus is not a coin-slot vending-machine it is intended to offer the advantages of such machine and, in addition, that of a cash-carrier, a parcel-carrier, a cash-register, and a parcel register, and while it performs the functions of these different machines it is in some respects an improvement on each. The amount of cash received during the day can be ascertained from the machine, yet it does not depend upon the clerk to register the transaction, and while it conveys the pay and the change and the parcel sold it requires no clerk at the sales-counter to receive or send them, and at the close of the day's business the machine will show not only the amount of goods sold, but also the amount of each particular class of goods disposed of. Other machines may automatically sell goods without a clerk at the sales-counter; but the present machine, by combining a carrier apparatus connecting the store-room with the stock-room and a registering mechanism, is adapted to a much more comprehensive use. Goods of different prices and in different-sized parcels may be sold at the same station, and it provides for the sale of goods that are in a distant stock-room and for making change, and it also allows for the money to be examined before the goods are delivered, thereby avoiding the imposition of false coins by the customer.

A machine by which the above results may be attained in a satisfactory way must provide a means for communicating an order to the operator in the distant stock-room, and this means must be so simple that the most indifferent customer will need no assistance. My machine meets these requirements by combining with a carrier apparatus a set of sample-holders at each customer's station to hold and exhibit samples or other representatives of the articles offered for sale and a conveyer corresponding to each sample-holder to communicate between said sample-holder and the main station. The drawings show two sets of conveyers, one set adapted to convey the register-checks and the other the purchase-money, each set bearing numbers to correspond with numbers borne by the sample-holders and by the articles offered for sale, so that the operator can tell by either or both sets of conveyers what article is ordered.

It will be observed that my invention is broad enough to permit the discarding of the register mechanism without departing from the scope of the claims, and when the registering mechanism is thus left off the trailer-hook $y$ may be arranged to swing out farther from the main track, so that it will engage the pin $r$ on the coupling-rod whenever the cable is reversed, and the mechanism which adjusts the coupling-bar $p$ for engagement with said hook may be omitted.

Having thus fully described my invention, what I claim, and desire to secure by Letters Patent, is—

1. In a vending apparatus, the combination of means for holding and exhibiting samples of articles of merchandise, a device adjacent each sample-holder for communicating an order for a duplicate of the article to a stock-room at a distance, and means for receiving and transmitting the purchase-money to the stock-room and returning the purchased article and the customer's change, substantially as set forth.

2. In a vending-machine, the combination, of means for holding and exhibiting a series of samples of merchandise, a device adjacent each sample-holder for communicating an order for the article to a distant point, as a stock-room, means for receiving the purchase-money, and means whereby the act of giving the order and depositing the purchase-money registers the purchase, and means for delivering the article ordered at the place of deposit of the purchase-money.

3. In a vending-machine, the combination, of means for exhibiting a series of samples of merchandise, a device adjacent each sample-holder for communicating an order for that particular article to a distant point, as a stock-room, means for receiving and transmitting the purchase-money to a distant point and returning the ordered article to the place of deposit of the purchase-money, and means whereby the act of sending the order and depositing the purchase-money registers the purchase of each article separately.

4. In a vending-machine, the combination, of a sample holder and exhibitor, a device adjacent the same for communicating an order for a duplicate of the article exhibited to a distant point, as a stock-room, means for transmitting the purchase-money to said distant point and for returning the purchased article to the customer from said distant point, and means for locking said order-communicating devices while an order is being filled.

5. In a vending-machine, the combination, of sample holding and exhibiting devices, an order-communicating device adjacent each sample holder and exhibitor, means for transmitting the purchase-money and returning the change together with the purchased article, means for registering each order, and means for locking the registering and order-communicating devices while each order is being filled.

6. In a vending-machine, the combination, of a sample-exhibitor, a carrier apparatus adapted to transmit purchase-money and an order-indicating check to a distant stock-room, a device for holding indicating-checks adjacent to the sample-exhibitor for discharging a check into the carrier apparatus with each order, for the purposes set forth.

7. In a vending-machine, a main track, a propelling medium, a series of cars adapted to be propelled thereby, coupling devices adapted to couple the cars to the propelling medium, means whereby the cars are adapted to particular stations along the main track, a group of sample-holders adjacent each station, devices for depositing order-checks in the cars, and means operated by the order-depositing devices for adjusting the coupling devices for engagement with the propelling medium.

8. In a vending-machine, the combination, of a track, a propelling medium, a car adapted to said track, coupling devices, means adjacent to said track for exhibiting samples of merchandise, a device adjacent each sample-exhibitor for depositing an order-check in the car, and means whereby the deposit of the order-check adjusts the coupling devices for engagement with the propelling medium.

9. In a vending-machine, the combination, of a carrier apparatus comprising a propelling medium, a series of cars, coupling devices, a track and means whereby the cars are adapted to be delivered at various points along the track, means for exhibiting samples of merchandise, means for communicating an order for any particular article to a distant stock department, to which department the carrier apparatus extends, and means whereby the giving of the order adjusts the coupling devices for engagement with the propelling medium.

10. In a store-service or vending machine, the combination, of a carrier apparatus, connecting a salesroom with a stock department, a series of sample-holders in the salesroom, a series of order-check holders corresponding in number with said sample-holder, means adjacent each sample-holder for ejecting a check from its corresponding check-holder and depositing it in the car of the carrier apparatus, and means whereby the act of depositing the order-check causes the car of the carrier apparatus to be transmitted to the stock-room with the order.

11. In a vending apparatus, the combination, of a carrier apparatus employing a car and propelling medium and extending from a salesroom to a stock-room, a group of sample-holders in the salesroom, means adjacent each sample-holder for depositing purchase-money in the car of the carrier apparatus, an order-check holder for each sample-holder, means adjacent each sample-holder for depositing an order-check from its corresponding check-holder into the car, and means for automatically locking all the check-depositing devices after an order is given and for holding said devices unlocked when the car is at its station awaiting an order.

12. In a vending apparatus, a carrier apparatus comprised of a propelling medium and a car, said car carrying a series of separate order-check receivers, a group of sample-holders and a group of stationary order-check holders corresponding in number therewith and with the check-holders on the car, a device adjacent each sample-holder for ejecting an order-check from one of the stationary check-holders into its corresponding check-holders on the car, substantially as set forth.

13. In a vending apparatus, the combination, of a car and means for propelling it back and forth between a salesroom and a stock-room, a series of separate order-check receivers on the car and means for temporarily segregating each order-check deposited in said check-receivers, a series of stationary order-check holders corresponding in number and relation to the check-receivers on the car, sample-exhibitors corresponding in number and relation to the check-holders and receivers, and means adjacent each sample-exhibitor for depositing an order-check from its corresponding check-holder into the corresponding check-receiver on the car, for the purposes set forth.

14. In a vending apparatus, the combination, of a car and means for propelling it, said car being provided with a series of separate check-receivers, a group of sample-holders, a stationary check-magazine, a device adjacent each sample-holder for ejecting a check from the stationary magazine into the check-receiver on the car corresponding with the sample desired, for the purpose set forth.

15. In a vending-machine, the combination of a series of money-chutes corresponding to articles of merchandise offered for sale, a car and means for propelling the same to and from a distant point, as a stock-room, a series of money-receptacles carried by said car and adapted to receive and keep separate the money received from the several money-chutes, for the purpose set forth.

16. In a vending-machine, the combination of a propelling means, a car adapted to be propelled from a store-room to a distant stock-room, said car carrying a series of separate money-receptacles, and a series of separate order-check receptacles, a series of money-chutes corresponding to and discharging into the separate money-receptacles on the car, means for carrying a series of order-checks, and means whereby when an order for an article of merchandise is given, an order-check will be deposited in the corresponding order-check holder on the car and the purchase-money will be deposited in the corresponding money-receptacle of the car, for the purpose set forth.

17. In a vending-machine, the combination of a car and means for propelling it back and forth from a store-room to a stock-room, a pay-receptacle on the car, a money-chute supported adjacent to the car and discharging into said receptacle, a valve normally closing this money-chute, means whereby the valve is opened when the money-receptacle is under the money-chute, for the purpose set forth.

18. In a vending-machine, the combination of a carrier apparatus having stations for customers at a cabinet in a salesroom, and a main station for the operator at a distant point, as in an adjoining stock-room, with a set of sample-holders in the salesroom for holding and exhibiting samples or other representatives of articles for sale, a pay-receptacle adjacent or otherwise related to each sample-holder, and means embracing a series of pay-conveyers corresponding to said pay-receptacles and to the class of articles offered for sale, each of said pay-conveyers being adapted to receive the pay for its corresponding article and from its appropriate receptacle and to convey the pay to the operator's station, whereby the customer may order an article by depositing pay for the same at the deposit point or receptacle adjacent to the sample and the pay be conveyed to the operator and the purchased article and change be forwarded to the customer's station.

19. In a vending-machine, the combination of a carrier apparatus having a propelling medium, a main way and cars adapted to be propelled thereon, stations for customers along the way, a main station for the operator at a distant point, as in a stock-room, a set or group of sample-holders at each customer's station for holding and exhibiting samples or other representatives of the articles offered for sale, a pay-receptacle or deposit-place adjacent or otherwise directly related to each sample-holder, a series of pay-conveyers corresponding to the deposit-place and to the class of articles for sale, and means by which the purchase-money for an article when deposited at its appropriate place will be received in its appropriate pay-conveyer and be conveyed to the main station and the operator by observing what conveyer brings the money be able to tell what article is wanted and at which station it is wanted.

20. In a vending-machine, the combination of a carrier apparatus, having a propelling medium, a main way and cars adapted to be propelled thereon, subordinate stations for customers along the way, a main station for the operator at a distant point, as a stock-room, a series of sample-holders at the substations for holding and exhibiting samples or other representatives of the articles offered for sale, means by which an order for an article is conveyed from a substation to the main station, and a series of initiative parts adapted to be manipulated and to put into action the order-conveying mechanism, one of said parts being adjacent or otherwise definitely related to each of said sample-holders, whereby the customer by manipulating the appropriate initiative part may cause an order to be conveyed to the main station for the article he desires and the article may be sent to him at the substation from which the order is sent.

21. In a vending-machine, the combination in a carrier apparatus, having a propelling medium, a main way and cars adapted to be propelled thereon, subordinate stations for customers along the way, a main station for the operator at a distant point, a set of sample-holders at each substation for holding an exhibiting-sample or other representative of the articles offered for sale, means by which an order for an article is conveyed from the substation, to the main station, registering mechanism by the operation of which it can be learned from the machine how many orders have been sent, from what station sent and for what articles, a series of initiative parts which being manipulated will put into action the order-conveying mechanism and also put into action registering mechanism, one of said parts being adjacent or otherwise definitely related to each of said sample-holders, whereby the customer by manipulating the appropriate initiative part may cause an order to be conveyed to the main station for the article he desires and at the same time cause a register of the order to be made.

22. In a vending-machine, the combination of a carrier apparatus, connecting a salesroom and a stock-room, a series of sample-holders in the salesroom for exhibiting samples or other representatives of articles offered for sale, a series of pay-conveyers each of which corresponds by number to a class of articles represented by one of said samples, and a pay-deposit place adjacent or otherwise related to each of said samples, with means embracing a series of initiative parts which being manipulated will operate the recording mechanism, one of said parts being adjacent or otherwise related to each of said pay-deposit places, whereby the customer will manipulate one of said parts as he deposits the pay for the article he desires and each sale will be recorded as the article is selected and paid for.

23. In a machine for vending a series of articles adapted to connect distant points, as a salesroom with a stock-room, a carrier apparatus between said points, and means for communicating to the stock-room an order for an article by depositing in the salesroom the purchase-money for such article, said means embracing a separate money-receptacle corresponding to each article offered for sale and a separate conveyer corresponding to each money-receptacle and its related article.

In testimony whereof I hereunto affix my signature, in the presence of two witnesses, this 23d day of June, 1900.

JUDSON B. HURD.

Witnesses:
  HERBERT C. EMERY,
  WM. R. DAVIS.